US010917267B2

(12) United States Patent
Welch

(10) Patent No.: US 10,917,267 B2
(45) **Date of Patent: *Feb. 9, 2021**

(54) METHOD AND SYSTEM FOR SPLIT VOLTAGE DOMAIN RECEIVER CIRCUITS

(71) Applicant: Luxtera LLC., Wilmington, DE (US)

(72) Inventor: Brian Welch, San Diego, CA (US)

(73) Assignee: Luxtera LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,596

(22) Filed: Dec. 30, 2019

(65) Prior Publication Data

US 2020/0136868 A1 Apr. 30, 2020

Related U.S. Application Data

(63) Continuation of application No. 16/379,219, filed on Apr. 9, 2019, now Pat. No. 10,523,477, which is a (Continued)

(51) Int. Cl.

*H04B 10/00* (2013.01)
*H04L 25/06* (2006.01)
(Continued)

(52) U.S. Cl.

CPC ......... *H04L 25/061* (2013.01); *H04B 10/501* (2013.01); *H04B 10/516* (2013.01); *H04B 10/564* (2013.01); *H04B 10/60* (2013.01); *H04B 10/693* (2013.01); *H04L 25/0272* (2013.01); *G02B 6/4201* (2013.01); *G02B 6/4242* (2013.01)

(58) Field of Classification Search

CPC ... H04B 10/69; H04B 10/693; H03F 3/45179; H03F 3/45188; H03F 3/45201; H03F 3/45215; H03F 3/45228; H03F 3/45242; H03F 3/45255; H03F 3/45269

See application file for complete search history.

(56) References Cited

U.S. PATENT DOCUMENTS 8,731,410 B2 * 5/2014 Welch .................. H04B 10/516 398/202
9,806,920 B2 * 10/2017 Welch .................. H04B 10/564
(Continued)

*Primary Examiner* — Daniel G Dobson
(74) *Attorney, Agent, or Firm* — Patterson + Sheridan, LLP

(57) ABSTRACT

Methods and systems for split voltage domain receiver circuits are disclosed and may include amplifying complementary received signals in a plurality of partial voltage domains. The signals may be combined into a single differential signal in a single voltage domain. Each of the partial voltage domains may be offset by a DC voltage from the other partial voltage domains. The sum of the partial domains may be equal to a supply voltage of the integrated circuit. The complementary signals may be received from a photodiode. The amplified received signals may be amplified via stacked common source amplifiers, common emitter amplifiers, or stacked inverters. The amplified received signals may be DC coupled prior to combining. The complementary received signals may be amplified and combined via cascode amplifiers. The voltage domains may be stacked, and may be controlled via feedback loops. The photodetector may be integrated in the integrated circuit.

20 Claims, 8 Drawing Sheets

Related U.S. Application Data continuation of application No. 16/105,567, filed on Aug. 20, 2018, now Pat. No. 10,263,816, which is a continuation of application No. 15/785,066, filed on Oct. 16, 2017, now Pat. No. 10,057,091, which is a continuation of application No. 15/412,352, filed on Jan. 23, 2017, now Pat. No. 9,806,920, which is a continuation of application No. 15/045,216, filed on Feb. 16, 2016, now Pat. No. 9,553,676, which is a continuation of application No. 14/281,241, filed on May 19, 2014, now Pat. No. 9,264,143, which is a continuation of application No. 12/208,668, filed on Sep. 11, 2008, now Pat. No. 9,731,410.

(60) Provisional application No. 60/997,282, filed on Oct. 2, 2007.

(51) Int. Cl.

| | |
|---|---|
| ***H04B 10/60*** | (2013.01) |
| ***H04L 25/02*** | (2006.01) |
| ***H04B 10/50*** | (2013.01) |
| ***H04B 10/516*** | (2013.01) |
| ***H04B 10/564*** | (2013.01) |
| ***H04B 10/69*** | (2013.01) |
| *H04J 14/00* | (2006.01) |
| *G02B 6/42* | (2006.01) |

(56) References Cited

U.S. PATENT DOCUMENTS 10,057,091 B2 * 8/2018 Welch .................. H04B 10/501
10,263,816 B2 * 4/2019 Welch .................... H04B 10/60
10,523,477 B2 * 12/2019 Welch .................. H04B 10/693

* cited by examiner

65

250

METHOD AND SYSTEM FOR SPLIT VOLTAGE DOMAIN RECEIVER CIRCUITS

CROSS-REFERENCE TO RELATED APPLICATIONS/INCORPORATION BY REFERENCE

This application is a continuation of application Ser. No. 16/379,219 filed on Apr. 9, 2019, now U.S. Pat. No. 10,523,477, which is a continuation of application Ser. No. 16/105,567 filed on Aug. 20, 2018, now U.S. Pat. No. 10,263,816, which is a continuation of application Ser. No. 15/785,066, filed on Oct. 16, 2017, now U.S. Pat. No. 10,057,091, which is a continuation of application Ser. No. 15/412,352, filed on Jan. 23, 2017, now U.S. Pat. No. 9,806,920, which is a continuation of application Ser. No. 15/045,216, filed on Feb. 16, 2016, now U.S. Pat. No. 9,553,676, which is a continuation of application Ser. No. 14/281,241, filed on May 19, 2014, now U.S. Pat. No. 9,264,143, which is a continuation of application Ser. No. 12/208,668, filed on Sep. 11, 2008, now U.S. Pat. No. 8,731,410, which in turn makes reference to, claims priority to and claims the benefit of U.S. Provisional Patent Application No. 60/997,282 filed on Oct. 2, 2007.

This application also makes reference to:

U.S. patent application Ser. No. 12/208,650 filed on Sep. 11, 2008.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to integrated circuit power control. More specifically, certain embodiments of the invention relate to a method and system for split voltage domain receiver circuits.

BACKGROUND OF THE INVENTION

Electronic circuits typically require a bias voltage for proper operation. The voltage level required by a circuit depends on the application. A circuit for transmitting electromagnetic radiation may require a higher voltage than a circuit used for processing data. The optimum voltage may be determined by the bias voltage requirements of the transistors, or other active devices, within the circuit.

A bipolar transistor circuit may require a higher voltage in amplifier applications to avoid saturation of the amplifier, as opposed to switching operations, for example. CMOS circuits may require a lower voltage to drive the MOSFETs in the circuit.

Furthermore, as device sizes continue to shrink for higher speed and lower power consumption, a high voltage may degrade performance and cause excessive leakage. With thinner gate oxides, gate leakage current may become significant using historical bias voltages, thus driving gate voltages lower. However, if a transmitter/receiver may be integrated in the same device, a higher bias voltage may also be required. Bias voltages are typically DC voltage, and may be supplied by a battery. However, there may be noise in the bias voltage, which may be mitigated by capacitive filters. The variable output voltage of batteries my affect operation of battery powered devices. Devices generally must be capable of operating over a large range of voltage due to the variable output voltage capability of batteries.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for split voltage domain receiver circuits, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for split voltage domain receiver circuits. Exemplary aspects of the invention may comprise amplifying complementary received signals in a plurality of partial voltage domains. The signals may be combined into a single differential signal in a single voltage domain. Each of the partial voltage domains may be offset by a DC voltage from the other partial voltage domains. The sum of the partial domains may be equal to a supply voltage of the integrated circuit. The complementary signals may be received from a photodiode. The amplified received signals may be amplified via stacked common source amplifiers, common emitter amplifiers, or stacked inverters. The amplified received signals may be DC coupled prior to combining. The complementary received signals may be amplified and combined via cascode amplifiers. The voltage domains may be stacked, and may be controlled via feedback loops. The photodetector may be integrated in the integrated circuit.

Figure 1A:
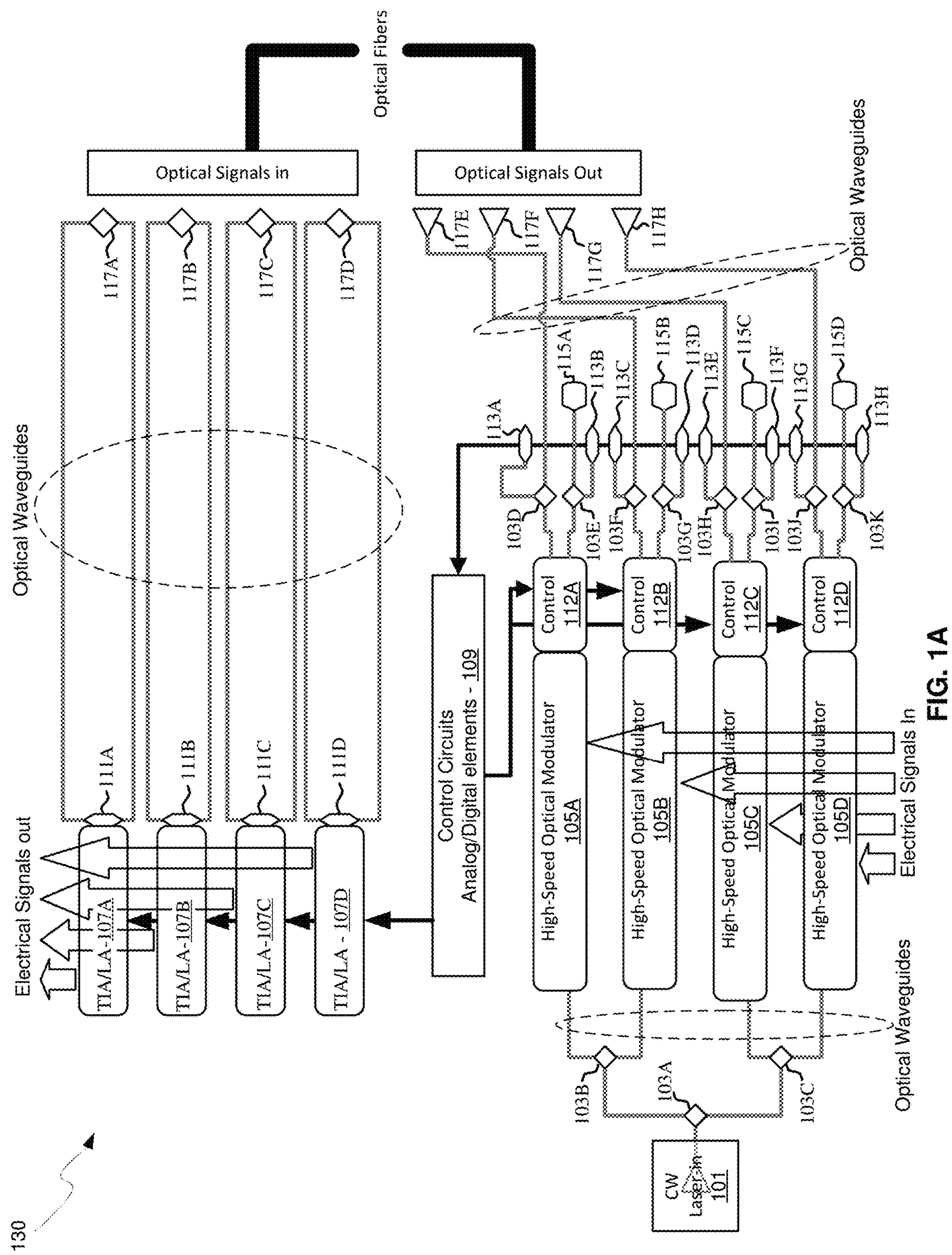
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There is also shown electrical device and circuits comprising transimpedance and limiting amplifiers (TIA/LAs) 107A-107D, analog and digital control circuits 109, and control sections 112A-112D. Optical signals are communicated between optical and optoelectronic devices via optical waveguides fabricated in the CMOS chip 130.

The high speed optical modulators 105A-105D comprise Mach-Zehnder or ring modulators, for example, and enable the modulation of the CW laser input signal. The high speed optical modulators 105A-105D are controlled by the control sections 112A-112D, and the outputs of the modulators are optically coupled via waveguides to the grating couplers 117E-117H. The taps 103D-103K comprise four-port optical couplers, for example, and are utilized to sample the optical signals generated by the high speed optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and the grating couplers 117E-117H are utilized to couple light from the CMOS chip 130 into optical fibers. The optical fibers may be epoxied, for example, to the CMOS chip, and may be aligned at an angle from normal to the surface of the CMOS chip 130 to optimize coupling efficiency.

The high-speed photodiodes 111A-111D convert optical signals received from the grating couplers 117A-117D into electrical signals that are communicated to the TIA/LAs 107A-107D for processing. The electrical signals generated by the high-speed photodiodes 111A-111D may be sensed in differential mode and amplified in a plurality of voltage domains. The sum of the individual voltage domains may sum up to the supply voltage. In this manner, the voltage swing across each stage of the receiver circuitry, such as stacked inverters, may be halved, while still providing the same photogenerated current, thus doubling the gain, improving the signal to noise ratio and the efficiency. The signals may then be combined into a single voltage domain via stacked common source amplifiers, for example. The analog and digital control circuits 109 may control gain levels or other parameters in the operation of the TIA/LAs 107A-107D. The TIA/LAs 107A-107D then communicate electrical signals off the CMOS chip 130.

The control sections 112A-112D comprise electronic circuitry that enable modulation of the CW laser signal received from the splitters 103A-103C. The high speed optical modulators 105A-105D require high-speed electrical signals to modulate the refractive index in respective branches of a Mach-Zehnder interferometer (MZI), for example. The voltage swing required for driving the MZI is a significant power drain in the CMOS chip 130. Thus, if the electrical signal for driving the modulator may be split into domains with each domain traversing a lower voltage swing, power efficiency is increased. Photogenerated signals may be sensed at both terminals of a photodiode, increasing the power efficiency, and then amplified in separate voltage domains.

Figure 1B:
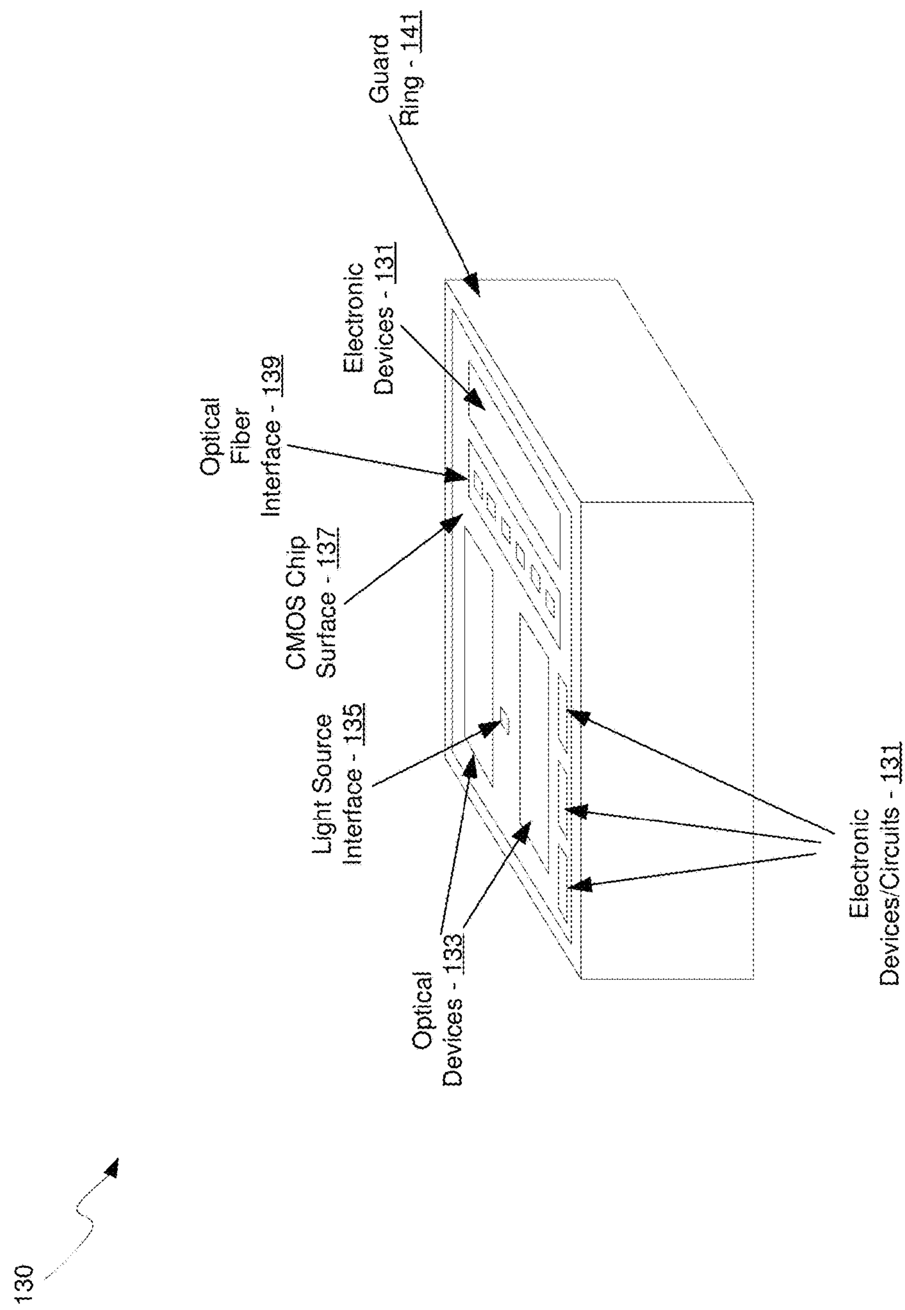
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip surface 137, an optical fiber interface 139, and CMOS guard ring 141.

The light source interface 135 and the optical fiber interface 139 comprise grating couplers that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the TIA/LAs 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, high speed optical modulators 105A-105D, high-speed photodiodes 111A-111D, and monitor photodiodes 113A-113H.

Figure 1C:
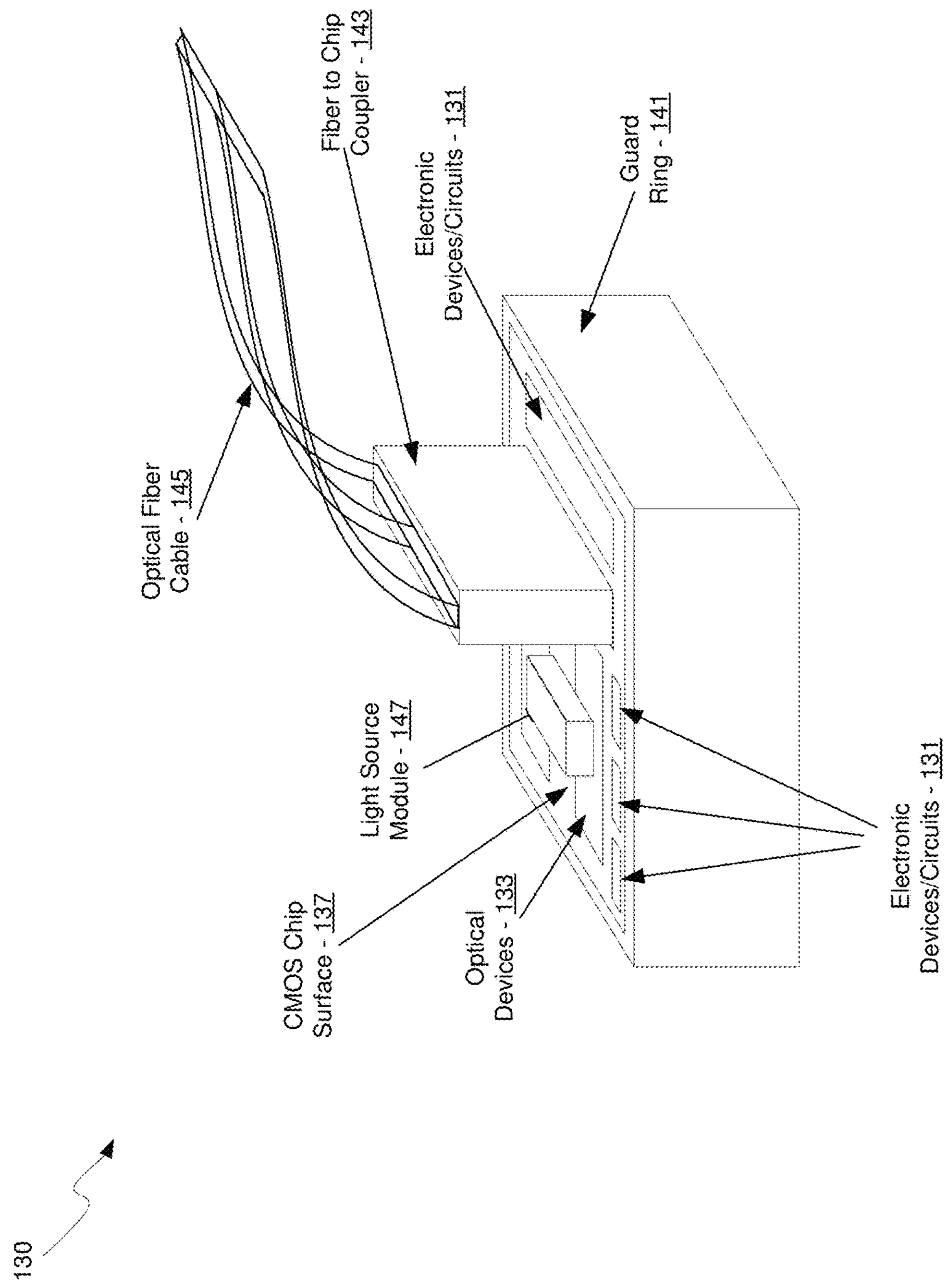
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the electronic devices/circuits 131, the optical and optoelectronic devices 133, the light source interface 135, the CMOS chip surface 137, and the CMOS guard ring 141. There is also shown a fiber to chip coupler 143, an optical fiber cable 145, and a light source module 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

The light source module 147 may be affixed, via epoxy or solder, for example, to the CMOS chip surface 137. In this manner a high power light source may be integrated with optoelectronic and electronic functionalities of one or more high-speed optoelectronic transceivers on a single CMOS chip.

The power requirements of optoelectronic transceivers is an important parameter. Minimizing voltage swings is one option for reducing power usage, and operating photodiodes in differential mode enable reduced power consumption with improved signal to noise ratio. Photogenerated signals may be sensed at both terminals of a photodiode and amplified in separate voltage domains. Following the amplification of the photogenerated signals, they may be combined into a single voltage domain prior to subsequent processing, such as digital processing, for example.

Figure 1D:
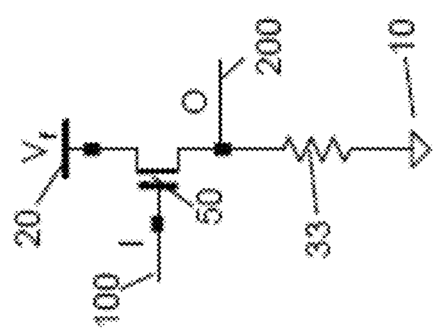
FIG. 1D is a block diagram of an exemplary n-type field effect transistor circuit, in accordance with an embodiment of the invention.
Figure 1D:
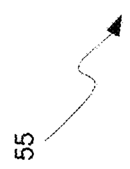

FIG. 1D is a block diagram of an exemplary n-type field effect transistor circuit, in accordance with an embodiment of the invention. Referring to FIG. 1D, there is shown a source follower circuit 55 comprising an n-channel field effect transistor (NFET) 50, a resistor 33, a high rail 20, and a low rail 10. There is also shown a circuit input 100 and a circuit output 200.

The source follower circuit 55 has two power rails, comprising the high rail 20 biased at a voltage $V_f$, or full voltage, and the low rail 10, marked with the customary symbol of "ground". The circuit has an input 100 on the gate of the NFET 50, while the circuit output 200 is on the NFET source side, or simply source. The NFET 50 drain side, or drain, is connected to the high rail 20. The resistor 33 is coupled between the source terminal of the NFET 50 and the low rail 10, completing an electrical path between the high 20 and low 10 rails.

In operation, an input signal is applied to the input 100. The source follower circuit 55 may be utilized to lower the impedance level in the signal path, drive resistive loads, or to provide DC level shifting, since the gate-source DC voltage drop may be controllable by the bias current. The gain of the source follower circuit 55 may be near unity, resulting in an AC output signal at the circuit output 200, but with a configurable DC output level.

Figure 1E:
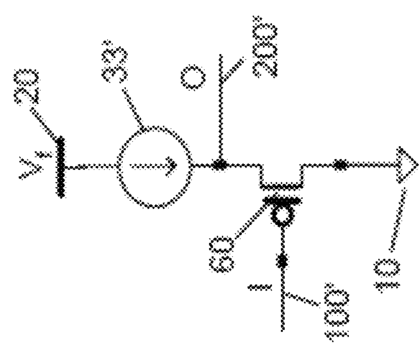
FIG. 1E is a block diagram of an exemplary p-type field effect transistor circuit, in accordance with an embodiment of the invention.

FIG. 1E is a block diagram of an exemplary p-type field effect transistor circuit, in accordance with an embodiment of the invention. Referring to FIG. 1E, there is shown a source follower circuit 65 comprising a p-channel field effect transistor (PFET) 60, a current source 33', a high rail 20, and a low rail 10. There is also shown a circuit input 100' and a circuit output 200'.

The PFET source follower has two power rails, comprising a high rail 20 at a voltage $V_f$, or full voltage, and a low rail 10, marked with the "ground" symbol. The circuit has an input 100' on the PFET 60 gate, while the circuit output 200' is on the PFET 60 source side, or simply source. The PFET 60 drain side, or drain, is connected to the low rail 10. The current source 33' is coupled to the high rail 20 and the PFET 60 source, completing an electrical path between the high 20 and low 10 rails.

In operation, an input signal is applied to the input 100'. The source follower circuit 65 may be utilized to lower the impedance level in the signal path, drive resistive loads, or to provide DC level shifting, since the gate-source DC voltage drop may be controllable by the bias current. The gain of the source follower circuit 65 may be near unity, resulting in a similar AC output signal at the circuit output 200', but with a configurable DC output level.

Figure 2:
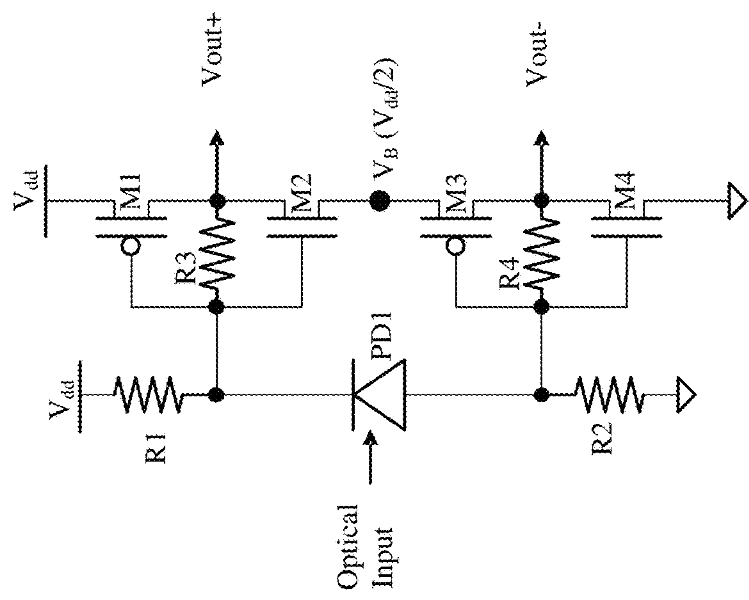
FIG. 2 is a block diagram of an exemplary two-domain receiver circuit, in accordance with an embodiment of the invention.

FIG. 2 is a block diagram of an exemplary two-domain receiver circuit, in accordance with an embodiment of the invention. Referring to FIG. 2, there is shown a stacked domain transimpedance amplifier (TIA) 250 comprising compensation resistors R1 and R2, feedback resistors R3 and R4, PMOS transistors M1 and M3, and NMOS transistors M2 and M4. There is also shown a photodiode PD1, bias voltage $V_{dd}$, and an output signal defined by $V_{out}$+ and $V_{out}$−. Although the circuit in FIG. 2 shows a ground connection at the source terminal of NMOS transistor M4 and one terminal of the compensation resistor R2, the invention is not so limited. Accordingly, a bias voltage may be applied instead of ground to increase or decrease the voltage swing as desired.

The interconnection of the transistor pairs M1/M2 and M3/M4 comprise a stacked inverter pair and enables the generation of a differential signal at $V_{out}$+ and $V_{out}$− from the electrical signal generated by the photodiode PD1 when subjected to an optical signal. In an exemplary embodiment, the coupling point, VB, at the source terminal of the NMOS transistor M2 and the PMOS transistor M3 is configured to be equal to $V_{dd}/2$, thus generating two voltage domains of equal magnitude. The tuning of this voltage may be enabled by the compensation resistors R1 and R2, with variations in the transistor devices, for example, as a source of imbalance. The feedback resistors R3 and R4 may flatten the gain curve of the amplifiers defined by M1/M2 and M3/M4, respectively, and result in increased bandwidth. In another embodiment of the invention, the stacked inverters may be cascoded for increased output impedance and stage gain.

In operation, an optical signal is applied to the photodiode PD1. The electrical signal generated by the photodiode PD1 may be amplified by the stacked inverters M1/M2 and M3/M4. By biasing VB at $V_{dd}/2$, and applying the photodiode PD1 signal to each of the inverters defined by M1/M2 and M3/M4, the photodiode PD1 is thus monitored in a complementary mode. In this manner, the gain may be double that of a single inverter but at the same photodiode current, thus increasing the signal to noise ratio and increasing power efficiency. This configuration has an advantage over conventional designs for generating differential signals, in that DC coupling is possible with the present invention, eliminating the low frequency corner issue from AC coupling capacitors at the outputs of a conventional amplifier.

Figure 3:
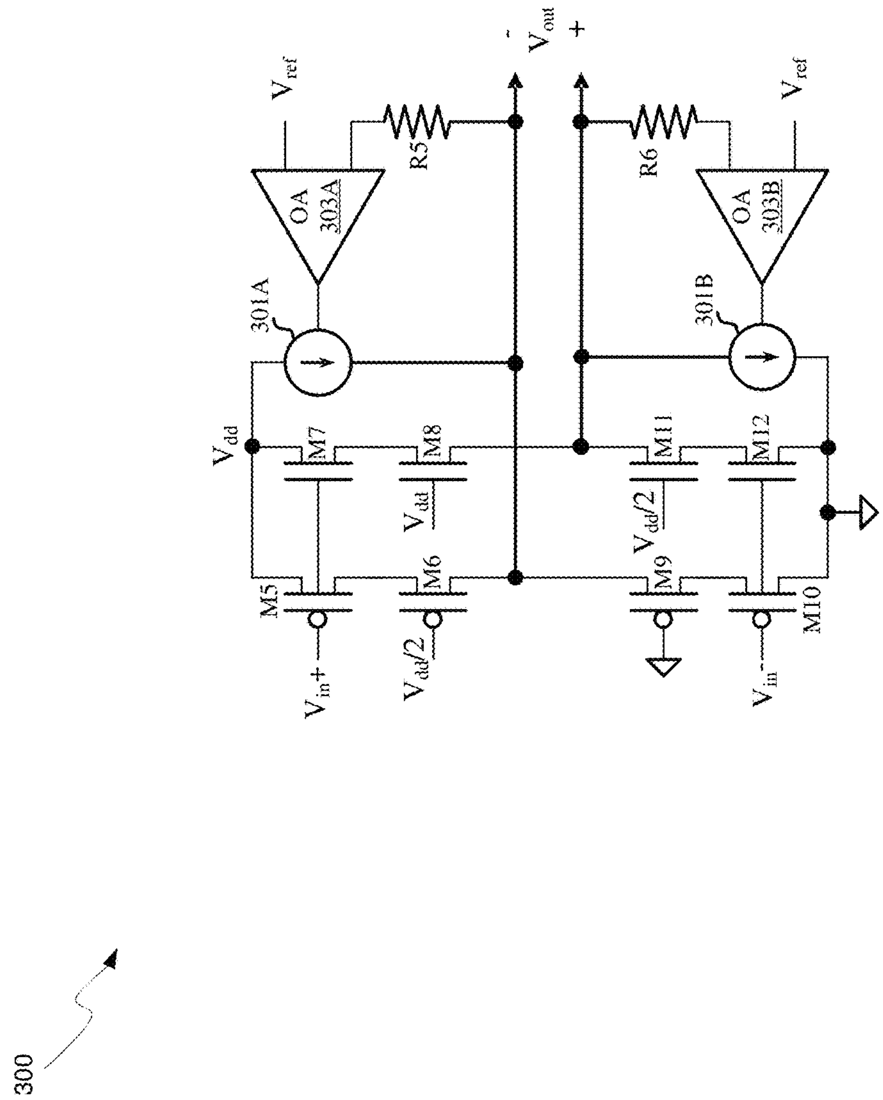
FIG. 3 is a schematic of an exemplary transimpedance amplifier domain combiner, in accordance with an embodiment of the invention.

FIG. 3 is a schematic of an exemplary transimpedance amplifier domain combiner, in accordance with an embodiment of the invention. Referring to FIG. 3, there is shown a TIA combiner 300 comprising PMOS transistors M5, M6, M9, and M10, NMOS transistors M7, M8, M11, and M12, current sources 301A and 301B, comparators 303A and 303B, and compensation resistors R5 and R6. There is also shown input terminals $V_{in}$+ and $V_{in}$− at the gate terminals of transistors M5 and M10, respectively, and output terminals $V_{out}$+ and $V_{out}$−.

The gate terminal of transistor M8 may be coupled to $V_{dd}$, the gate terminals of transistors M6 and M11 may be coupled to $V_{dd}/2$, and the gate terminal of transistor M9 may be coupled to ground. In this manner, the bias conditions for the stacked cascodes in a common source configuration may define two voltage domains centered around $V_{dd}/2$, and the signals communicated to the two inputs at $V_{in}$+ and $V_{in}$− may see the same loading and thus the same latency, but with a DC offset. In instances where the loading is not symmetric, jitter would result.

In operation, complementary input signals in separate voltage domains, as described with respect to FIG. 2, may be coupled to the input terminals $V_{in}$+ and $V_{in}$−. The input signals may then be amplified and combined into a common domain by the separate voltage domain cascodes comprising the transistors M5/M6/M7/M8 and M9/M10/M11/M12, respectively, resulting in a differential signal at the $V_{out}$+ and $V_{out}$− outputs. The interconnection of the common source amplifiers results in a combining of the separate domains. An increase in the magnitude of the received photogenerated differential signal, i.e. the voltage difference between $V_{in}$+ and $V_{in}$− is increasing, results in an increased potential at $V_{out}$+ due to transistor M8 being biased in an ON state and transistor M7 conducting more current with increasing gate voltage, pulling $V_{out}$+ toward $V_{dd}$. Similarly, with transistor M9 biased ON with its gate at ground and transistor M10 conducting more current with reduced gate voltage, $V_{out}$− is thus pulled towards ground. Conversely, a decrease in the magnitude of the received photogenerated signal results in an increase at $V_{out}$− with transistor M5 more conductive due to the reduced gate voltage, and a decrease at $V_{out}+$ with transistor M12 more conductive due to the increased gate voltage at $V_{in}-$.

The compensation resistors R5 and R6 may enable sensing of the DC voltage at the $V_{out}+$ and $V_{out}-$ outputs, respectively, which may be compared to a voltage reference by the comparators 303A and 303B, which may then adjust the DC level of the differential signal to $V_{dd}/2$ by adjusting the current in the current sources 301A and 301B. The current sources 301A and 301B may comprise push-pull capability to source or sink current, thereby controlling the DC level to the midpoint, $V_{dd}/2$.

Figure 4:
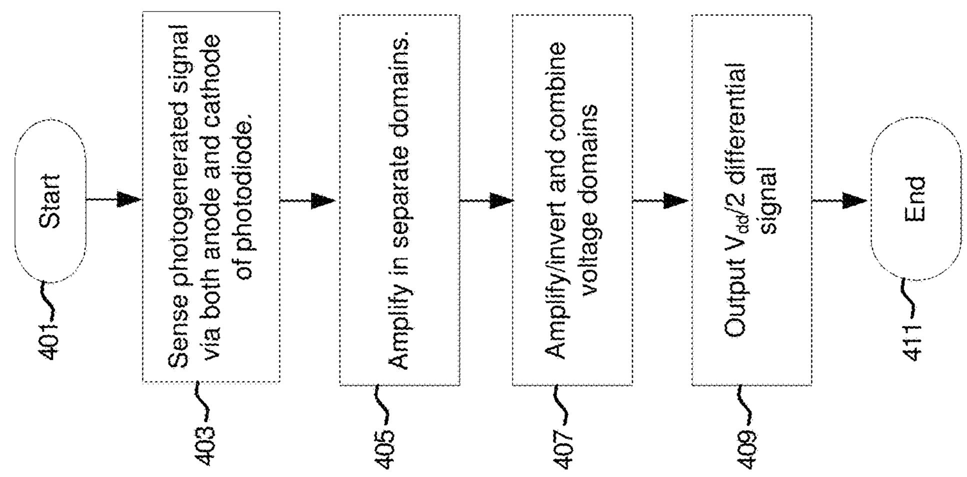
FIG. 4 is a flow chart illustrating exemplary steps in the operation of a split domain transimpedance amplifier with domain combiner, in accordance with an embodiment of the invention.

FIG. 4 is a flow chart illustrating exemplary steps in the operation of a split domain transimpedance amplifier with domain combiner, in accordance with an embodiment of the invention. In step 403, after start step 401, a photogenerated signal may be sensed at both the anode and cathode of a photodiode. In step 405, the two electrical signals may be amplified by different voltage domain circuitry to reduce the voltage swing in each domain. In step 407, the signal may be amplified and/or inverted and combined into a single voltage domain. In step 409, a $V_{dd}/2$ differential signal may be output, followed by end step 411.

In an embodiment of the invention, a method and system are disclosed for amplifying complementary received signals in a plurality of partial voltage domains. The signals may be combined into a single differential signal in a single voltage domain. Each of the partial voltage domains may be offset by a DC voltage from the other partial voltage domains. The sum of the partial domains may be equal to a supply voltage of the integrated circuit 130. The complementary signals may be received from a photodiode PD1. The amplified received signals may be amplified via stacked common source amplifiers, common emitter amplifiers, or stacked inverters M1/M2/M3/M4. The amplified received signals may be DC coupled prior to combining. The complementary received signals may be amplified and combined via cascode amplifiers M5/M6/M7/M8 and M9/M10/M11/M12. The voltage domains may be stacked, and may be controlled via feedback loops. The photodetector PD1 may be integrated in the integrated circuit 130.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
amplifying an electrical signal using transistors operating in different partial voltage domains; and
combining output signals from the transistors via an amplifier for each partial voltage domain into a single differential signal in a single voltage domain, wherein each of the partial voltage domains is offset by a DC voltage from other partial voltage domains of the partial voltage domains.

2. The method of claim 1, wherein the amplifier for each partial voltage domain is a stacked cascode amplifier.

3. The method of claim 1, further comprising combining the amplified electrical signal via stacked common source amplifiers.

4. The method of claim 1, further comprising combining the amplified electrical signal via stacked common emitter amplifiers.

5. The method of claim 1, wherein the partial voltage domains are stacked.

6. The method of claim 1, further comprising controlling the partial voltage domains via feedback loops.

7. The method of claim 1, further comprising DC coupling the output signals before combining the output signals.

8. An integrated circuit comprising:
a first transistor configured to amplify an electrical signal in a first partial voltage domain offset by a second DC voltage from a second partial voltage domain;
a second transistor configured to amplify the electrical signal in the second partial voltage domain with a first DC voltage from the first partial voltage domain; and
a combiner receiving inputs from the first transistor and the second transistor configured to produce a single differential signal in a single voltage domain.

9. The integrated circuit of claim 8, wherein the electrical signal is received from a photodiode monitored in a complementary mode.

10. The integrated circuit of claim 8, further comprising:
a first stacked cascode amplifier configured to amplify the electrical signal in the first partial voltage domain; and
a second stacked cascode amplifier configured to amplify the electrical signal in the second partial voltage domain.

11. The integrated circuit of claim 8, wherein the combiner combines the inputs from the first transistor and the second transistor via stacked common source amplifiers.

12. The integrated circuit of claim 8, wherein the combiner combines the inputs via stacked common emitter amplifiers.

13. The integrated circuit of claim 8, wherein the partial voltage domains are stacked.

14. The integrated circuit of claim 8, further comprising controlling the partial voltage domains via feedback loops.

15. The integrated circuit of claim 8, wherein the inputs from the first transistor and the second transistor are DC coupled before being combined.

16. The integrated circuit of claim 8, wherein a sum of the first partial voltage domain and the second partial voltage domain is equal to a supply voltage of the integrated circuit.

17. A method, comprising:
amplifying an electrical signal in a first partial voltage domain and a second partial voltage domain; and
combining a first amplified signal from the first partial voltage domain with a second amplified signal from the second partial voltage domain into a single differential signal in a single voltage domain.

18. The method of claim 17, wherein the first partial voltage domain is offset by a second DC voltage from the first partial voltage domain and the second partial voltage domain is offset by a first DC voltage from the first voltage domain.

19. The method of claim 17, wherein the electrical signal is amplified by a first transistor operating in the first partial voltage domain and a second transistor operating in the second partial voltage domain.

20. The method of claim 17, wherein the electrical signal is amplified by a first stacked inverter operating in the first partial voltage domain and a second stacked inverter operating in the second partial voltage domain.

* * * * *

UNITED STATES PATENT AND TRADEMARK OFFICE

CERTIFICATE OF CORRECTION

PATENT NO. : 10,917,267 B2
APPLICATION NO. : 16/730596
DATED : February 9, 2021
INVENTOR(S) : Brian Welch It is certified that error appears in the above-identified patent and that said Letters Patent is hereby corrected as shown below:

On the Title Page

On the page 2, item (63), in Column 1, in "Related U.S. Application Data", Line 12, delete "9,731,410." and insert -- 8,731,410. --, therefor.

In the Specification

In Column 6, Line 2, delete "VB," and insert -- $V_B$, --, therefor.

In Column 6, Line 17, delete "VB" and insert -- $V_B$ --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*